(12) United States Patent
Chen

(10) Patent No.: US 10,984,216 B2
(45) Date of Patent: Apr. 20, 2021

(54) OPTICAL FINGERPRINT RECOGNITION SYSTEM AND FINGERPRINT IMAGE CAPTURING METHOD

(71) Applicant: NOVATEK Microelectronics Corp., Hsin-Chu (TW)

(72) Inventor: Chi-Ting Chen, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 34 days.

(21) Appl. No.: 16/560,961

(22) Filed: Sep. 4, 2019

(65) Prior Publication Data

US 2020/0193129 A1 Jun. 18, 2020

Related U.S. Application Data

(60) Provisional application No. 62/778,883, filed on Dec. 12, 2018.

(51) Int. Cl.
*G06K 9/00* (2006.01)

(52) U.S. Cl.
CPC ..... *G06K 9/00046* (2013.01); *G06K 9/00087* (2013.01)

(58) Field of Classification Search
CPC .......... G06K 9/00046; G06K 9/00087; G06K 9/0004; G06K 9/2027
See application file for complete search history.

(56) References Cited

U.S. PATENT DOCUMENTS

| 2005/0169506 | A1* | 8/2005 | Fenrich | G06K 9/00046 382/127 |
| 2009/0226052 | A1* | 9/2009 | Fedele | G06K 9/0008 382/125 |
| 2013/0301887 | A1 | 11/2013 | Miesak | |
| 2014/0232526 | A1* | 8/2014 | Carper | G06F 21/32 340/5.83 |

FOREIGN PATENT DOCUMENTS

| CN | 107223256 A | 9/2017 |
| CN | 107690653 A | 2/2018 |
| TW | 201804362 A | 2/2018 |

\* cited by examiner

*Primary Examiner* — Abhishek Sarma
(74) *Attorney, Agent, or Firm* — Winston Hsu

(57) ABSTRACT

An optical fingerprint recognition system is disclosed. The optical fingerprint recognition system comprises a processing circuit; and an image sensor comprising a pixel array; wherein in an enrollment operation, the processing circuit is configured to set a first exposure time and control the image sensor to capture a first fingerprint image according to the first exposure time and in a matching operation, the processing circuit is configured to set a second exposure time and control the image sensor to capture a second fingerprint image for the matching operation according to the second exposure time; wherein the first exposure time is longer than the second exposure time.

16 Claims, 5 Drawing Sheets

OPTICAL FINGERPRINT RECOGNITION SYSTEM AND FINGERPRINT IMAGE CAPTURING METHOD

CROSS REFERENCE TO RELATED APPLICATIONS

This application claims the benefit of U.S. provisional application No. 62/778,883, filed on Dec. 12, 2018, which is incorporated herein by reference.

BACKGROUND OF THE INVENTION

1. Field of the Invention

The present application relates to an optical fingerprint recognition system and a fingerprint image capturing method, and more particularly, to an optical fingerprint recognition system and a fingerprint image capturing method capable of achieving a good balance between an enrollment operation and a matching operation.

2. Description of the Prior Art

With the development of technology, mobile phones, digital cameras, tablet PCs, notebook computers and other electronic devices become more and more popular. The electronic devices are intended for personal use, with certain privacy. The information stored in the electronic device, such as phonebook, photos, personal information, etc., are privately owned. If the electronic device is lost, these data may be accessed by other people, causing unnecessary loss. Even though there are several ways using password to protect the electronic device from being used by the other people, the password may be easily to be spread or cracked, which lowers the security. Moreover, the user needs to remember the password so as to use electronic devices. If the user forgets the password, troubles would be brought to the user. Hence, personal fingerprint identification is utilized to achieve the purpose of personal identification, for enhancing the data security.

Fingerprint recognition comprises an enrollment operation and a matching operation. In the enrollment operation, a template fingerprint image is established and stored into a database. In the matching operation, a newly captured fingerprint image is compared with the template fingerprint image. Balance between the enrollment operation and a matching operation is desired.

SUMMARY OF THE INVENTION

It is therefore a primary objective of the present application to provide a fingerprint recognition system and a fingerprint image capturing method capable of achieving a good balance between the enrollment operation and a matching operation.

An embodiment of the present application discloses an optical fingerprint recognition system, comprising a processing circuit; and an image sensor comprising a pixel array; wherein in an enrollment operation, the processing circuit is configured to set a first exposure time and control the image sensor to capture a first fingerprint image according to the first exposure time and in a matching operation, the processing circuit is configured to set a second exposure time and control the image sensor to capture a second fingerprint image for the matching operation according to the second exposure time; wherein the first exposure time is longer than the second exposure time.

An embodiment of the present application further discloses a fingerprint image capturing method, applied in an optical fingerprint recognition system comprising an image sensor and a processing circuit, the fingerprint image capturing method comprising performing an enrollment operation, comprising setting a first exposure time; and controlling the image sensor to capture a first fingerprint image for the enrollment operation according to the first exposure time; and performing a matching operation, comprising setting a second exposure time; and controlling the image sensor to capture a second fingerprint image for the matching operation according to the second exposure time; wherein the first exposure time is longer than the second exposure time.

An embodiment of the present application further discloses an optical fingerprint recognition system, comprising a processing circuit; and an image sensor, comprising a pixel array; wherein in an enrollment operation, the processing circuit is configured to make a first exposure setting and control the image sensor to capture a first fingerprint image for the enrollment operation according to the first exposure setting, and in a matching operation, the processing circuit is configured to make a second exposure setting and control the image sensor to capture a second fingerprint image for the matching operation according to the second exposure setting; wherein the first exposure setting and the second exposure setting are made such that a first effective area of the first fingerprint image is larger than a second effective area of the second fingerprint image.

These and other objectives of the present invention will no doubt become obvious to those of ordinary skill in the art after reading the following detailed description of the preferred embodiment that is illustrated in the various figures and drawings.

DETAILED DESCRIPTION

Fingerprint recognition comprises an enrollment operation and a matching operation. In the enrollment operation, a template fingerprint image is established and stored into a database. In the matching operation, a newly captured fingerprint image is compared with the template fingerprint image.

For the enrollment operation, a large effective area of the fingerprint image is necessary. The large effective area of the fingerprint image takes time, meaning that the large effective area takes a long exposure time. However, the long exposure time would degrade user experience when performing the matching operation. Therefore, it is necessary to improve the user experience.

Figure 1:
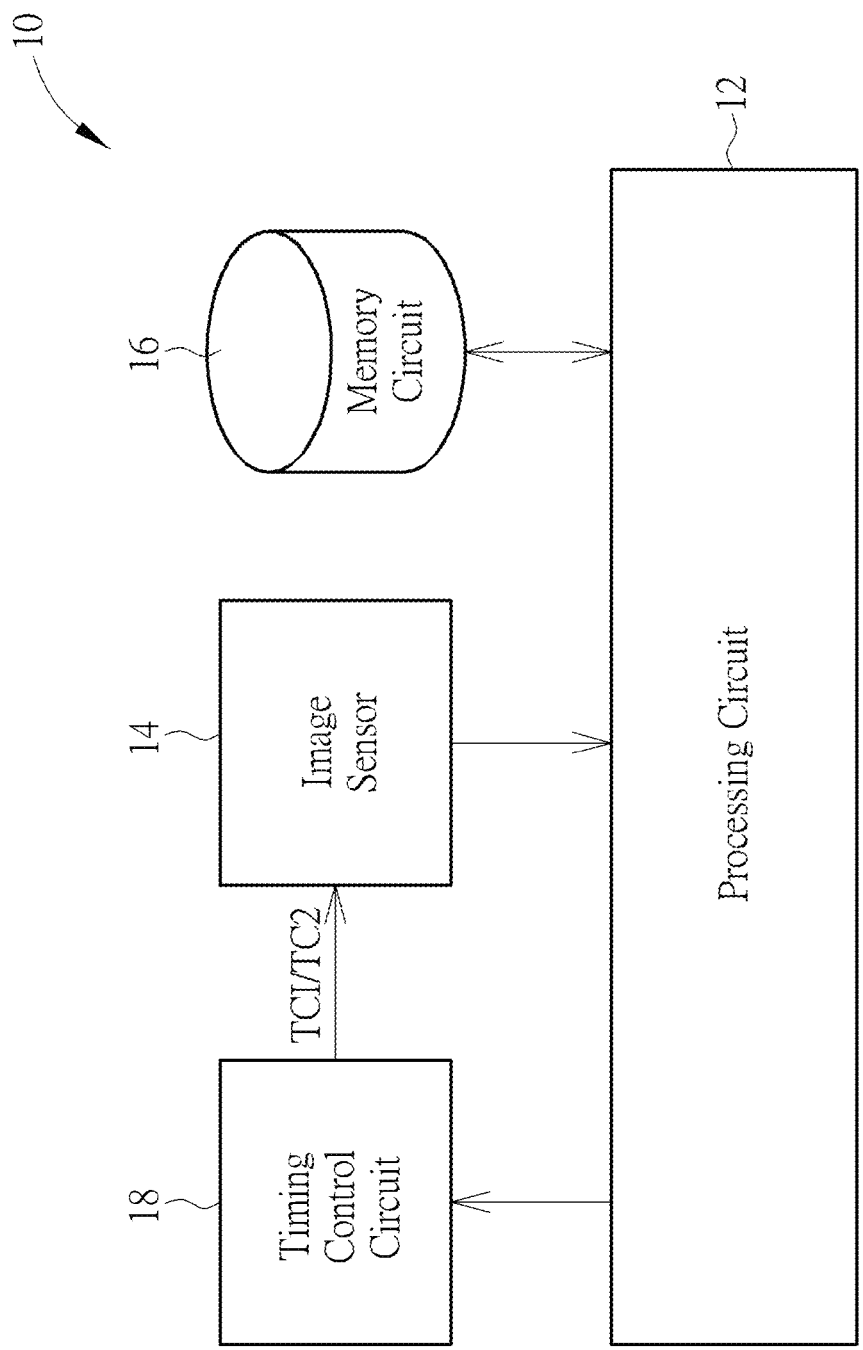
FIG. 1 is a schematic diagram of an optical fingerprint recognition system according to an embodiment of the present application.

FIG. 1 is a schematic diagram of an optical fingerprint recognition system 10 according to an embodiment of the present application. The optical fingerprint recognition system 10 may be disposed in an electronic device such as mobile phone or tablet computer. The optical fingerprint recognition system 10 comprises a processing circuit 12, an image sensor 14 and a timing control circuit 18. The processing circuit 12 may be an application processor of the electronic device in which the system 10 is disposed, served as a "host" in the image sensor's perspective. The image sensor 14 may be a CIS (CMOS Image Sensor) and comprises a pixel array PXA, wherein the pixel array PXA comprises a plurality of pixel circuits PX. The image sensor 14 is configured to generate a fingerprint image FPM in general. The timing control circuit 18, coupled between the processing circuit 12 and the image sensor 14, may comprise a counter. The timing control circuit 18 is configured to control/adjust an exposure time of the pixel array PXA.

In general, the optical fingerprint recognition system 10 is configured to perform an enrollment operation (in an enrollment stage) and a matching operation (in a matching stage). In the enrollment operation/stage, the processing circuit 12 establishes at least one template fingerprint image and stores the template fingerprint image into a memory circuit (or database) 16. In the matching operation/stage, the processing circuit 12 reads out the template fingerprint image from the memory circuit 16, compares a newly captured fingerprint image with the template fingerprint image, and determines whether the newly captured fingerprint image matches the template fingerprint image.

Figure 2:
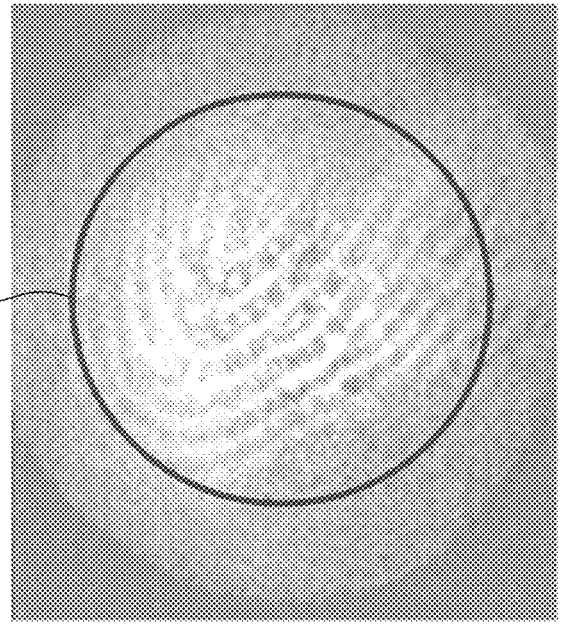
FIG. 2 illustrates two fingerprint images captured via two different exposure times.
Figure 2:
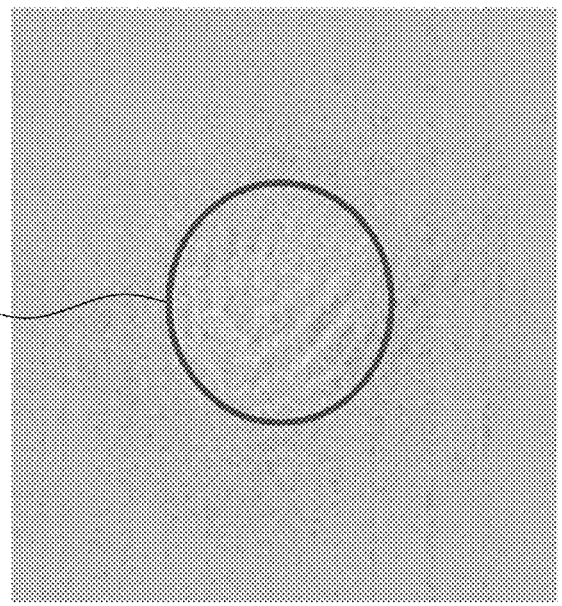

Note that, a length of the exposure time reflects an effective area of the fingerprint image. The longer the exposure time is used, the larger the effective area is obtained. For example, FIG. 2 illustrates two fingerprint images captured via two different exposure times. The fingerprint image in FIG. 2a is captured using a short exposure time (e.g., TE2, which will be narrated later) and the fingerprint image in FIG. 2b is captured using a long exposure time (e.g., TE1, which will be described later). Hence, as can be seen from FIG. 2, an effective area EA_a in FIG. 2a is smaller than an effective area EA_b in FIG. 2b.

Practically, for the enrollment stage's point of view, the enrollment operation usually requires large effective area of the fingerprint image to establish the template fingerprint image, such that longer exposure time is required. On the other hand, for the matching stage's point of view, long exposure time would degrade user experience.

In the prior art, the exposure time used for the enrollment stage and the exposure time used for the matching stage have the same length, and it is hard to achieve a good balance between the enrollment operation and the matching operation if the same exposure time is used for both operations.

Different from the prior art, different exposure times in different lengths are exploited for the enrollment operation/stage and for the matching operation/stage in the present application. That is, a first/long exposure time TE1 is utilized for the enrollment operation and a second/short exposure time TE2 is utilized for the matching operation (where the first exposure time TE1 is longer than the second exposure time TE2).

In other words, during the enrollment stage, the image sensor 14 uses the first/long exposure time TE1 to capture a first fingerprint image FPM_1. The processing circuit 12 establishes a template fingerprint image FPM_0 according to the first fingerprint image FPM_1, and stores the template fingerprint image FPM_0 into the memory circuit 16. The exposure times TE1 and TE2 can be set manually or automatically according to design requirements.

Once the processing circuit 12 enters into the matching stage, the image sensor 14 uses the second/short exposure time TE2 to capture a second fingerprint image FPM_2, where an effective area EA_2 of the second fingerprint image FPM_2 should be smaller than an effective area EA_1 of the first fingerprint image FPM_1 since the second exposure time TE2 is shorter than the first exposure time TE1. The processing circuit 12 reads out the template fingerprint image FPM_0 from the memory circuit 16, compares the second fingerprint image FPM_2 with the template fingerprint image FPM_0, and determines whether the second fingerprint image FPM_2 matches the template fingerprint image FPM_0. If yes/positive, the processing circuit 12 would perform an authentication operation, so as to, e.g., unlock a screen of the electronic device or to authenticate an electronic payment.

Figure 3:
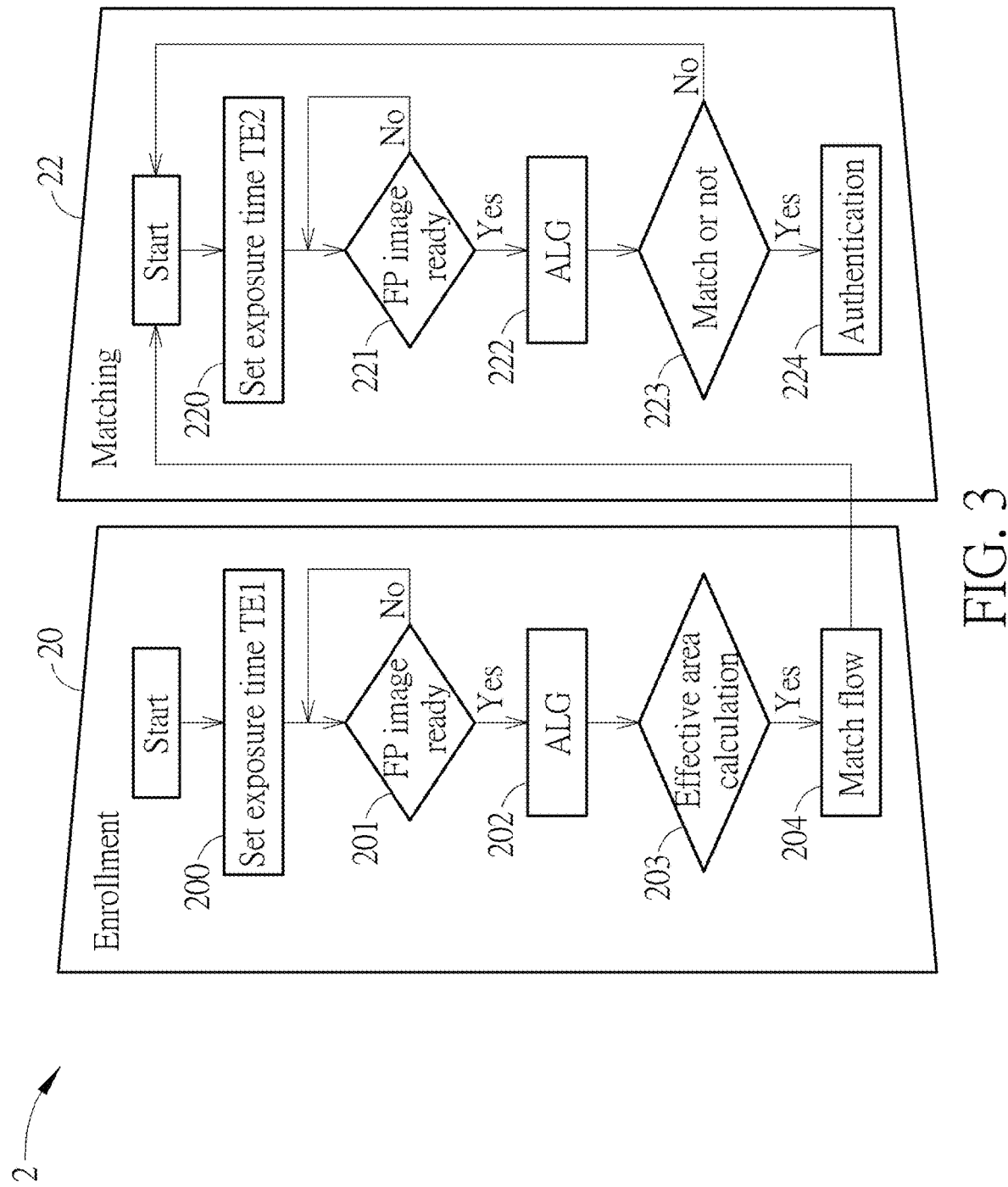
FIG. 3 is a schematic diagram of a fingerprint image capturing method according to an embodiment of the present application.

FIG. 3 is a schematic diagram of a fingerprint image capturing method 2 according to an embodiment of the present application. The fingerprint image capturing method 2, executed by the optical fingerprint recognition system 10, comprises an enrollment process 20 and a matching process 22. In Step 200, the processing circuit 12 makes a first exposure setting to set the exposure time TE1 as the setting of the exposure time of the image sensor 14. In Step 201, it is checked whether the first fingerprint image FPM_1 is ready, such that the first fingerprint image FPM_1 is captured according to the exposure time TE1. Step 201 (and the corresponding loop) can be regarded as the processing circuit 12 controlling the image sensor 14 to capture the first fingerprint image FPM_1 according to the first exposure time TE1. In Step 202, the processing circuit 12 performs the enrollment operation to establish the template fingerprint image FPM_0 according to the first fingerprint image FPM_1. In Step 203, the processing circuit 12 may check whether an effective area of either the first fingerprint image FPM_1 or the template fingerprint image FPM_0 is sufficient large. If yes, the system 10 goes to Step 204, in which the system 10 is ready for the matching operation. In Step 220, the processing circuit 12 makes a second exposure setting to set the exposure time TE2 as the setting of the exposure time of the image sensor 14. In Step 221, the second fingerprint image FPM_2 is captured according to the exposure time TE2. Step 221 (and the corresponding loop) can be regarded as the processing circuit 12 controlling the image sensor 14 to capture the second fingerprint image FPM_2 according to the second exposure time TE2. In Step 222, the processing circuit 12 performs the matching operation to compare the second fingerprint image FPM_2 with the template fingerprint image FPM_0, and determine whether the second fingerprint image FPM_2 matches the template fingerprint image FPM_0. If yes, in Step 224, the processing circuit 12 would perform the authentication operation.

In addition, the timing control circuit 18 may, under control of the processing circuit 12, send a first exposure-time control signal TC1 to the image sensor 14 to indicate to the image sensor 14 to capture the first fingerprint image FPM_1 according to the first exposure time TE1 when the processing circuit 12 performs the enrollment operation. Similarly, the timing control circuit 18 may, under control of the processing circuit 12, send a second exposure-time control signal TC2 to the image sensor 14 to indicate to the image sensor 14 to capture the second fingerprint image FPM_2 according to the second exposure time TE2 when the processing circuit 12 performs the matching operation.

Figure 4:
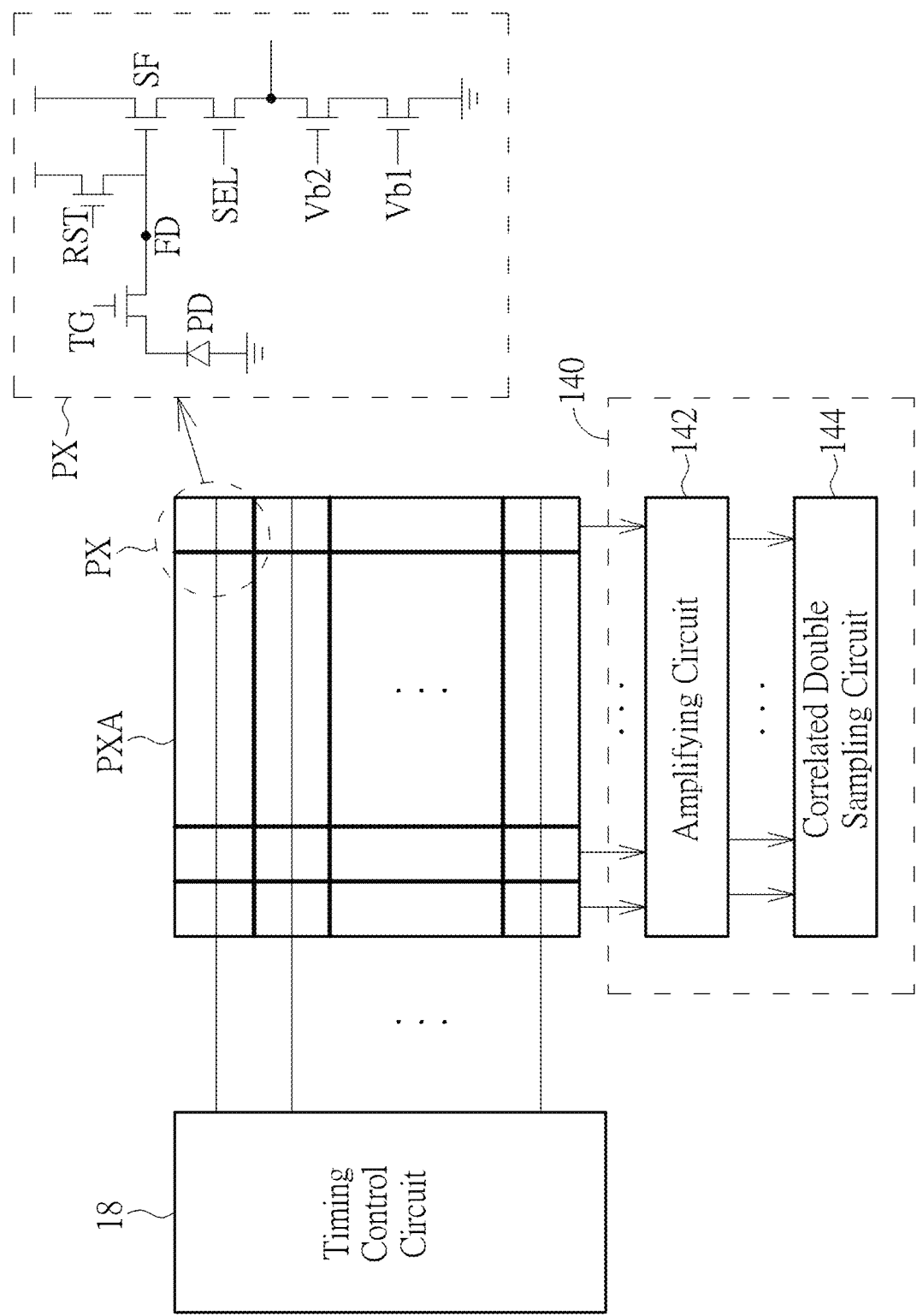
FIG. 4 is a schematic diagram of a pixel array and a pixel circuit according to an embodiment of the present application.
Figure 5:
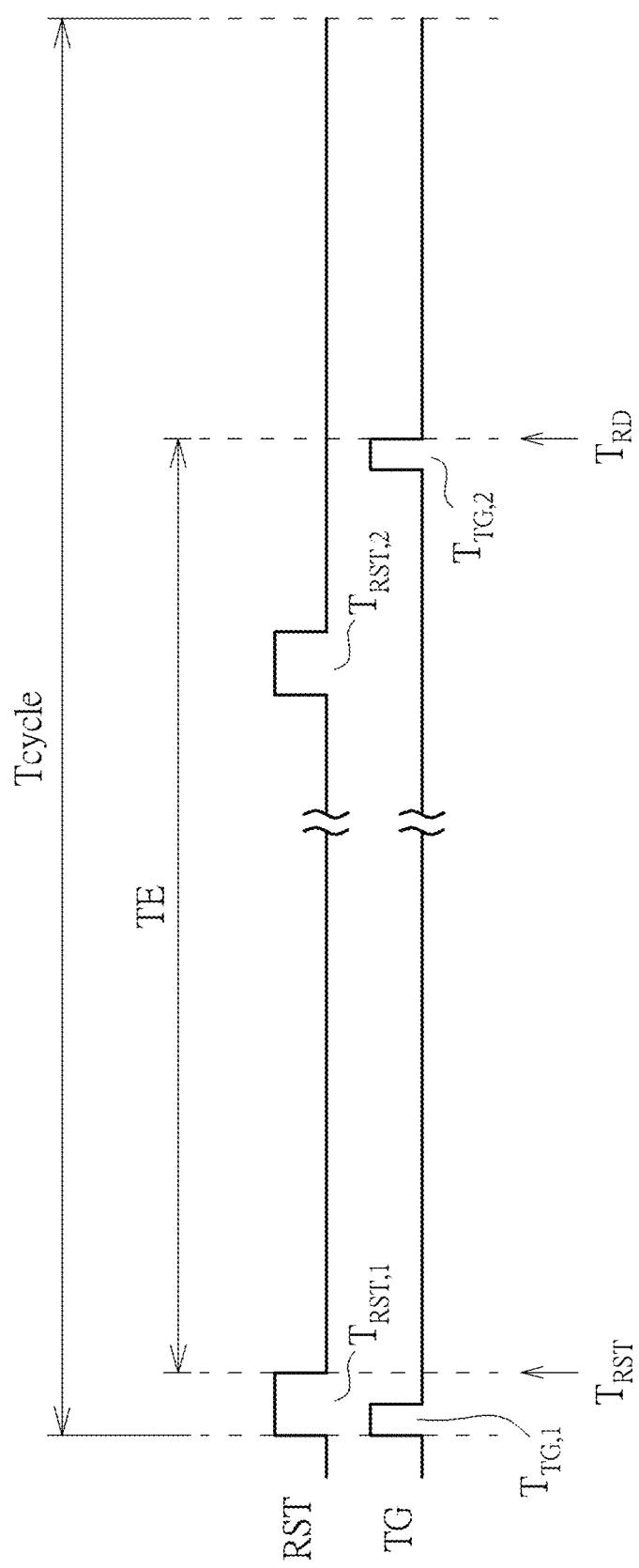
FIG. 5 is a schematic diagram of an exposure time according to an embodiment of the present application.

Furthermore, the exposure time in the present application is referred to a time difference between a reset time $T_{RST}$ and a readout time $T_{RD}$. Specifically, FIG. 4 is a schematic diagram of the pixel array PXA and the pixel circuit PX according to an embodiment of the present application. FIG. 5 is a schematic diagram of an exposure time TE according to an embodiment of the present application. In addition to the pixel array PXA comprising the plurality of pixel circuits PX arranged in an array, the image sensor 14 may comprise a front end module 140, where the front end module 140 may comprise an amplifying circuit 142 and a correlated double sampling circuit 144. The amplifying circuit 142 and the correlated double sampling circuit 144 may be coupled to the pixel array PXA. Details of the amplifying circuit 142 and the correlated double sampling circuit 144 and the connections thereof are known by the art, which is not narrated herein for brevity.

The pixel circuit PX comprises a photo diode PD, a transmission gate receiving a transmission gate signal TG, a reset transistor receiving a reset signal RST, a source follower SF, a select transistor receiving a select signal SEL. Waveforms of the transmission gate signal TG and the reset signal RST are illustrated in FIG. 5. The reset time $T_{RST}$ is corresponding to a time at which both the transmission gate and the reset transistor are conducted, and the readout time $T_{RD}$ is corresponding to a time at which the transmission gate is conducted but the reset transistor is cutoff.

For example, a time instant within a reset-transistor conducting time $T_{R,1}$ may be regarded as the reset time $T_{RST}$, since within the reset-transistor conducting time $T_{R,1}$, the transmission gate is conducted as well at a transmission-gate conducting time $T_{G,1}$. A time instant within a transmission-gate conducting time $T_{TG,2}$ can be regarded as the readout time $T_{RD}$, since within the transmission-gate conducting time $T_{TG,2}$, the transmission gate is conducted but the reset transistor is not. Note that, a reset-transistor conducting time $T_{R,2}$ (illustrated in FIG. 5) cannot be regarded as the reset time $T_{RST}$ since the transmission gate is not conducted within the reset-transistor conducting time $T_{R,2}$.

In the embodiment illustrated in FIG. 5, the reset time $T_{RST}$ is at a falling edge of the reset-transistor conducting time $T_{R,1}$, and the readout time $T_{RD}$ is at a falling edge of the transmission-gate conducting time $T_{TG,2}$. Further, the exposure time TE (in the embodiment illustrated in FIG. 5) is between the reset time $T_{RST}$ and readout time $T_{RD}$, within a cycle time $T_{cycle}$ of capturing one fingerprint image FPM.

Further, the pixel circuit(s) PX in FIG. 4 may be coupled to the timing control circuit 18. During the enrollment stage, the exposure time TE may be set as the first/long exposure time TE1 via the timing control circuit 18. During the matching stage, the exposure time TE may be set as the second/short exposure time TE2 via the timing control circuit 18. In an embodiment, the exposure-time control signal TC1/TC2 may be a timeout signal generated by the counter in the timing control circuit 18 corresponding to the exposure time TE1/TE2.

In summary, different exposure times in different lengths are exploited for the enrollment operation/stage and for the matching operation/stage. The first/long exposure time TE1 is utilized for the enrollment operation, for the completeness of the template fingerprint image. The second/short exposure time TE2 is utilized for the matching operation, without sacrificing the user experience. In the same or different embodiments, different effective areas of fingerprint images are exploited for the enrollment operation/stage and for the matching operation/stage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical fingerprint recognition system, comprising:
   a processing circuit; and
   an image sensor, comprising a pixel array;
   wherein in an enrollment operation, the processing circuit is configured to set a first exposure time and control the image sensor to capture a first fingerprint image according to the first exposure time and in a matching operation, the processing circuit is configured to set a second exposure time and control the image sensor to capture a second fingerprint image for the matching operation according to the second exposure time;
   wherein the first exposure time is longer than the second exposure time.

2. The optical fingerprint recognition system of claim 1, wherein in the enrollment operation, the processing circuit establishes a template fingerprint image according to the first fingerprint image and stores the template fingerprint image into a memory circuit.

3. The optical fingerprint recognition system of claim 2, wherein in the matching operation, the processing circuit reads out the template fingerprint image from the memory circuit, compares the second fingerprint image with the template fingerprint image, and determines whether the second fingerprint image matches the template fingerprint image.

4. The optical fingerprint recognition system of claim 1, wherein the first fingerprint image has a first effective area and the second fingerprint image has a second effective area smaller than the first image area.

5. The optical fingerprint recognition system of claim 1, further comprising a timing control circuit coupled between the processing circuit and the image sensor.

6. The optical fingerprint recognition system of claim 5, wherein the timing control circuit is configured to be under control of the processing circuit and send an exposure-time control signal to the image sensor to indicate to the image sensor to capture the first fingerprint image according to the first exposure time when the processing circuit performs the enrollment operation.

7. The optical fingerprint recognition system of claim 5, wherein the timing control circuit is configured to be under control of the processing circuit and send an exposure-time control signal to the image sensor to indicate to the image sensor to capture the second fingerprint image according to the second exposure time when the processing circuit performs the matching operation.

8. The optical fingerprint recognition system of claim 1, wherein after the processing circuit accomplishes the matching operation and determines that the second fingerprint image matches the template fingerprint image, the processing circuit performs an authentication operation.

9. The optical fingerprint recognition system of claim 1, wherein the pixel array comprises a plurality of pixel circuit, and each pixel circuit comprises:
   a photo diode;
   a transmission gate, coupled between the photo diode and a floating diffusion node; and a reset transistor, coupled to the floating diffusion node;
wherein an exposure time is a time difference between a reset time and a readout time.

10. The optical fingerprint recognition system of claim 9, wherein the reset time is corresponding to a first time at which both the transmission gate and the reset transistor are conducted, and the readout time is corresponding to a second time at which the transmission gate is conducted but the reset transistor is cutoff.

11. A fingerprint image capturing method, applied in an optical fingerprint recognition system comprising an image sensor and a processing circuit, the fingerprint image capturing method comprising:
performing an enrollment operation, comprising:
setting a first exposure time; and
controlling the image sensor to capture a first fingerprint image for the enrollment operation according to the first exposure time; and
performing a matching operation, comprising:
setting a second exposure time; and
controlling the image sensor to capture a second fingerprint image for the matching operation according to the second exposure time;
wherein the first exposure time is longer than the second exposure time.

12. The fingerprint image capturing method of claim 11, wherein the enrollment operation further comprises establishing a template fingerprint image according to the first fingerprint image and stores the template fingerprint image into a memory circuit.

13. The fingerprint image capturing method of claim 12, wherein the matching operation further comprises reading out the template fingerprint image from the memory circuit, comparing the second fingerprint image with the template fingerprint image, and determining whether the second fingerprint image matches the template fingerprint image.

14. The fingerprint image capturing method of claim 11, wherein the first fingerprint image has a first effective area and the second fingerprint image has a second effective area smaller than the first effective area.

15. An optical fingerprint recognition system, comprising:
a processing circuit; and
an image sensor, comprising a pixel array;
wherein in an enrollment operation, the processing circuit is configured to make a first exposure setting and control the image sensor to capture a first fingerprint image for the enrollment operation according to the first exposure setting, and in a matching operation, the processing circuit is configured to make a second exposure setting and control the image sensor to capture a second fingerprint image for the matching operation according to the second exposure setting;
wherein the first exposure setting and the second exposure setting are made such that a first effective area of the first fingerprint image is larger than a second effective area of the second fingerprint image.

16. The optical fingerprint recognition system of claim 15, wherein the first exposure setting comprises a first exposure time, and the second exposure setting comprises a second exposure time, and the first exposure time is longer than the second exposure time.

* * * * *